(12) United States Patent
Yuan et al.

(10) Patent No.: US 10,910,173 B2
(45) Date of Patent: Feb. 2, 2021

(54) BUTTON RESTORING MECHANISM AND ELECTRONIC DEVICE HAVING SAME

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Bo-Duo Yuan, Shenzhen (CN); Hai-Tao Wang, Shenzhen (CN)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/449,769

(22) Filed: Jun. 24, 2019

(65) Prior Publication Data

US 2020/0312586 A1 Oct. 1, 2020

(30) Foreign Application Priority Data

Mar. 28, 2019 (CN) .......................... 2019 1 0244479

(51) Int. Cl.
*H01H 13/14* (2006.01)
*H01H 13/04* (2006.01)
*H01H 13/52* (2006.01)

(52) U.S. Cl.
CPC ............ *H01H 13/14* (2013.01); *H01H 13/04* (2013.01); *H01H 13/52* (2013.01)

(58) Field of Classification Search
CPC ......... H01H 13/14; H01H 13/52; H01H 13/04
See application file for complete search history.

(56) References Cited

U.S. PATENT DOCUMENTS

| 8,299,376 | B2* | 10/2012 | Zhang | G06F 3/0338 |
| | | | | 200/339 |
| 8,331,107 | B2* | 12/2012 | Ouyang | H01H 13/14 |
| | | | | 200/321 |
| 2015/0294808 | A1* | 10/2015 | Liu | H01H 3/12 |
| | | | | 200/344 |
| 2018/0144889 | A1* | 5/2018 | Bahr | H01H 25/008 |

* cited by examiner

*Primary Examiner* — Edwin A. Leon
*Assistant Examiner* — Lheiren Mae A Caroc
(74) *Attorney, Agent, or Firm* — ScienBiziP, P.C.

(57) ABSTRACT

A button restoring mechanism of an electronic device includes a housing, an adjustment button mounted on the housing, a bracket, and an elastic member. One side of the adjustment button protrudes within the housing. The bracket latches with the adjustment button. One end of the elastic member is fixed to one side of the bracket, and a second end of the elastic member abuts against a second side of the bracket. An elastic force of the elastic member drives the second side of the bracket to abut against a switch button within the housing.

16 Claims, 5 Drawing Sheets

BUTTON RESTORING MECHANISM AND ELECTRONIC DEVICE HAVING SAME

FIELD

The subject matter herein generally relates to electronic devices, and more particularly to a button restoring mechanism for restoring a button of an electronic device.

BACKGROUND

Generally, electronic devices have adjustment buttons located on a housing of the electronic device. The adjustment button is pressed to press a switch button located within the housing. However, because of manufacturing tolerances of the adjustment button, the adjustment button may wear over time and misalign or become spaced apart from the switch button, which results in ineffective operation of the adjustment button.

BRIEF DESCRIPTION OF THE DRAWINGS

Implementations of the present disclosure will now be described, by way of embodiments, with reference to the attached figures.

DETAILED DESCRIPTION

Figure 1:
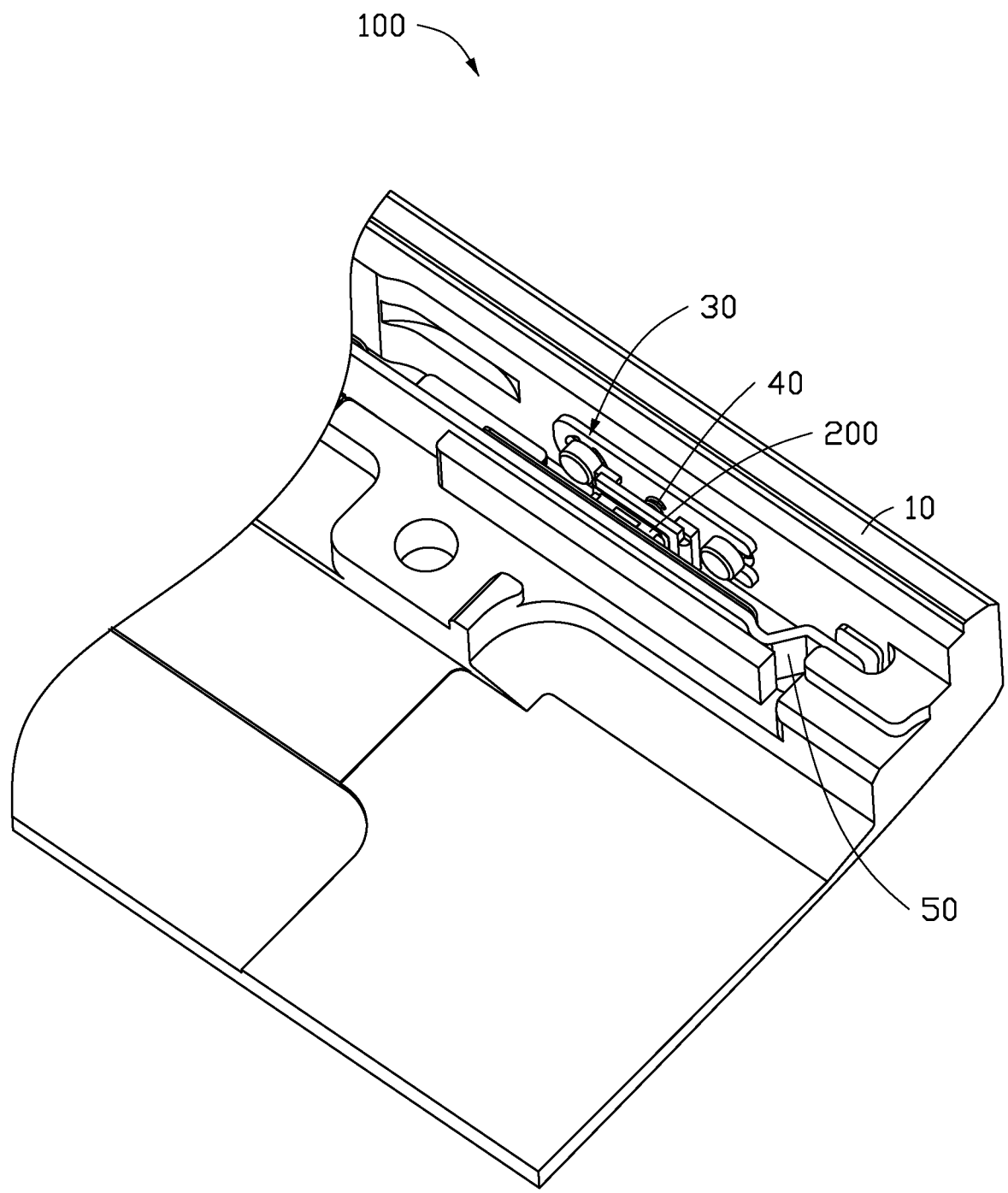
FIG. 1 is a partial isometric view of an embodiment of an electronic device having a button restoring mechanism.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

FIG. 1 illustrates an embodiment of an electronic device (not shown). The electronic device includes a button restoring mechanism 100 and a switch button 200.

Figure 2:
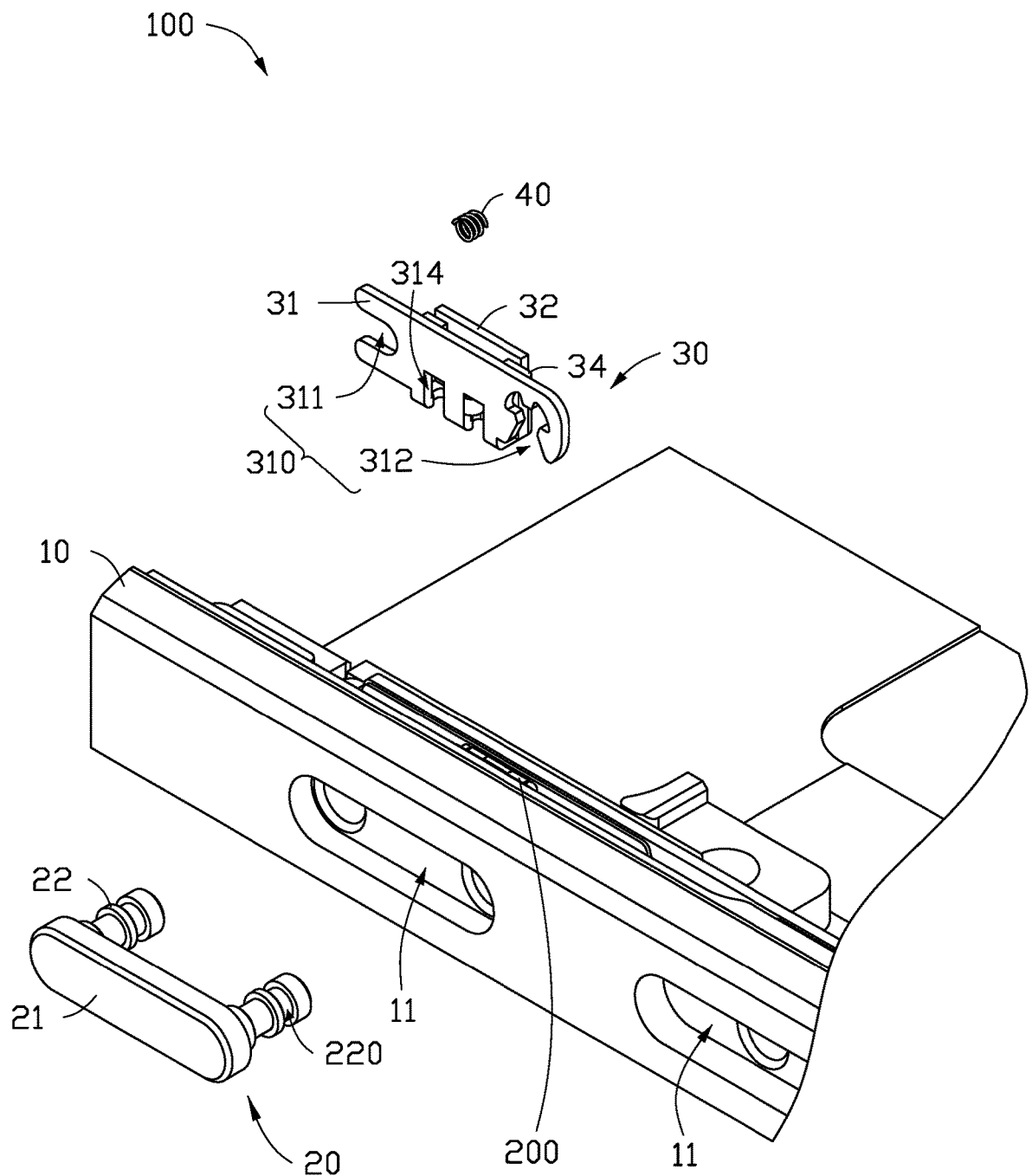
FIG. 2 is an exploded, isometric view of FIG. 1 taken from another angle.

Referring to FIG. 1 and FIG. 2, the button restoring mechanism 100 includes a housing 10 and an adjustment button 20. The adjustment button 20 is disposed on the housing 10. The button restoring mechanism 100 further includes a bracket 30 and an elastic member 40. One side of the adjustment button 20 protrudes toward inside the housing 10. The bracket 30 is fastened to the adjustment button 20. One end of the elastic member 40 is fixed to one side of the bracket 30, and another end of the elastic member 40 abuts against another side of the bracket 30. An elastic force of the elastic member 40 eliminates a gap between the bracket 30 and the switch button 200.

When the adjustment button 20 is pressed, the bracket 30 is moved to a predetermined position and compresses the elastic member 40 to bring the bracket 30 into contact with the switch button 200. When the adjustment button 20 is released, the bracket 30 and the elastic member 40 are reset and the elastic member 40 abuts against the bracket 30 to eliminate a gap between the bracket 30 and the switch button 200.

Figure 3:
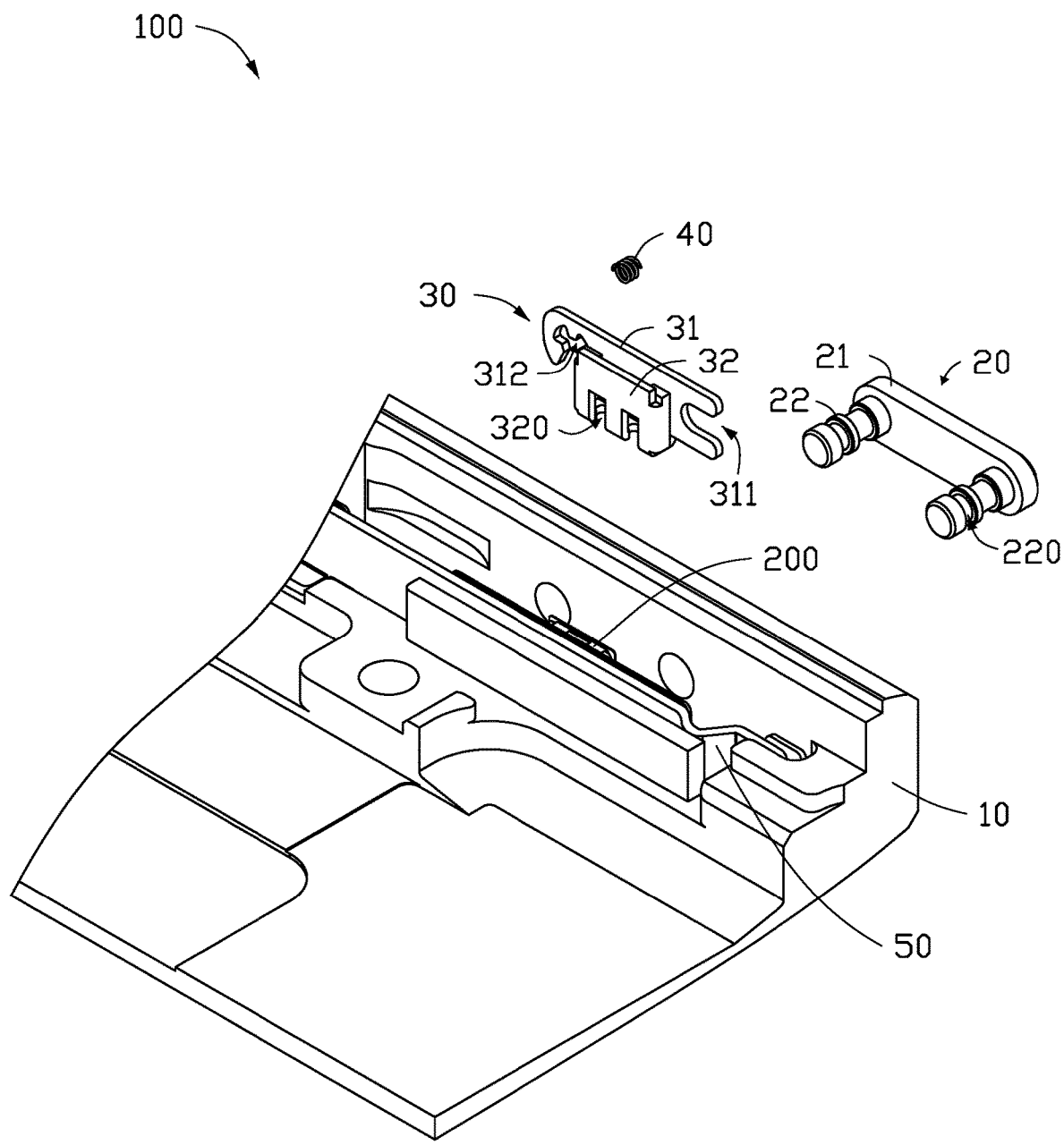
FIG. 3 is an exploded view of FIG. 1.

Referring to FIG. 2 and FIG. 3, a through hole 11 is defined in a sidewall of the housing 10. The adjustment button 20 and the switch button 200 are mounted on the housing 10, and the switch button 200 cooperates with the bracket 30 to control functions of the electronic device.

Referring to FIG. 2, the adjustment button 20 includes a button cap 21 and at least one protruding post 22 extending from the button cap 21. In one embodiment, the adjustment button 20 includes two protruding posts 22 extending from the button cap 21. When the adjustment button 20 is mounted on the housing 10, the button cap 21 is located outside the housing 10, and the protruding posts 22 protrude through the through holes 11 into an interior of the housing 10.

The protruding post 22 defines a groove 220. When the adjustment button 20 is mounted on the housing 10, the groove 220 is located inside the housing 10.

Figure 4:
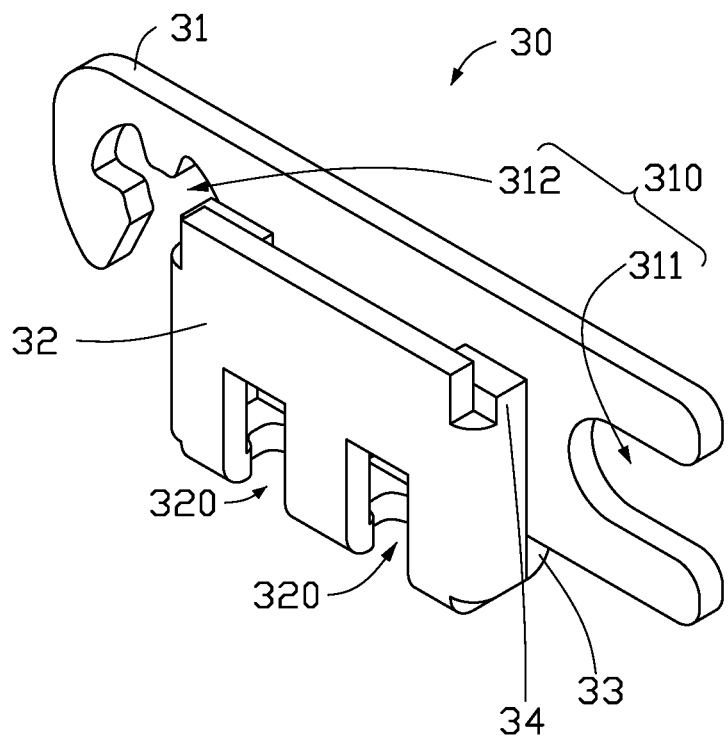
FIG. 4 is a close-up view of a bracket of the electronic device in FIG. 1.
Figure 5:
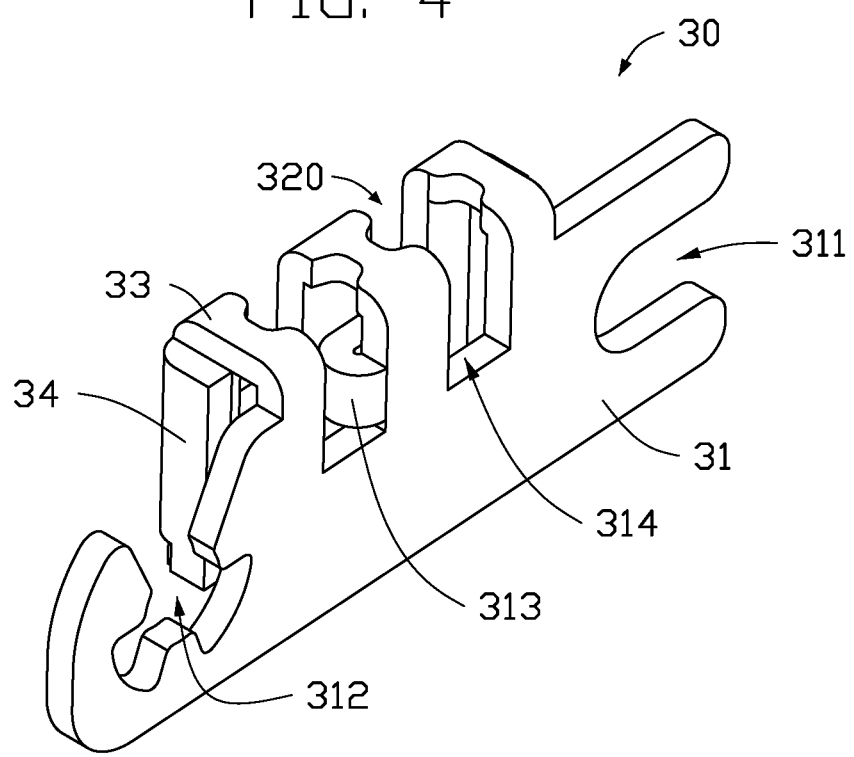
FIG. 5 is similar to FIG. 4, but shown from another angle.

Referring to FIGS. 4 and 5, the bracket 30 includes a first fixing portion 31, a second fixing portion 32, and a connecting portion 33. The connecting portion 33 couples the first fixing portion 31 to the second fixing portion 32. In one embodiment, the bracket 30 is made of stainless steel and has elasticity. The first fixing portion 31 and the second fixing portion 32 are substantially parallel to each other. A length of the second fixing portion 32 is less than a length of the first fixing portion 31. The connecting portion 33 is located on a same side of the first fixing portion 31 and the second fixing portion 32, such as a bottom side of the first fixing portion 31 and the second fixing portion 32. The first fixing portion 31, the second fixing portion 32, and the connecting portion 33 form a substantially U-shaped structure. The first fixing portion 31, the second fixing portion 32, and the connection portion 33 may be integrally formed. The first fixing portion 31 is configured to clamp the adjustment button 20, and the second fixing portion 32 is configured to abut against the switch button 200.

It can be understood that in other embodiments, the connecting portion 33 may be disposed on two opposite sides of the first fixing portion 31 and the second fixing portion 32, or the connecting portion 33 may be coupled to a top side of the first fixing portion 31 and the second fixing portion 32.

The first fixing portion 31 defines at least one opening 310, such as a first opening 311 and a second opening 312. The first opening 311 is an unclosed opening defined in one end of the first fixing portion 31 and is substantially U-shaped, and the second opening 312 is an unclosed opening defined in a second end of the first fixing portion 31 and is an irregular shape. The first fixing portion 31 engages with the protruding posts 22 through the first opening 311 and the second opening 312. Specifically, the protruding posts 22 respectively pass through the first opening 311 and the second opening 312, and the grooves 220 of the protruding posts 22 respectively receive an edge of the first opening 311 and the second opening 312 to latch the first fixing portion 31 with the adjustment button 20.

Figure 6:
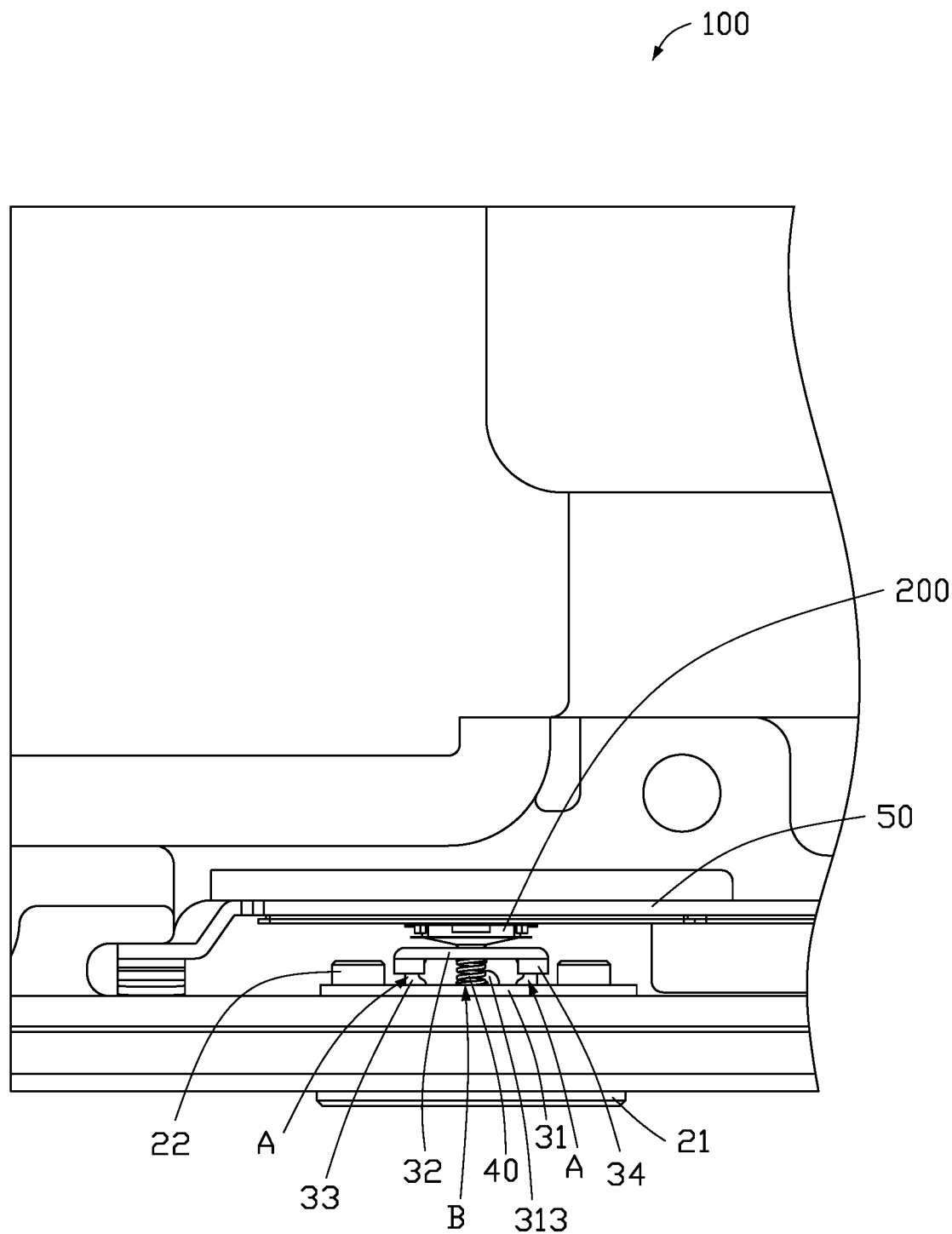
FIG. 6 is an assembled cross-sectional view of the electronic device in FIG. 1.

The first fixing portion 31 further includes a support platform 313. The support platform 313 protrudes from the first fixing portion 31 toward the second fixing portion 32 and is configured to support the elastic member 40, as shown in FIG. 6. It should be understood that in other embodiments, the support platform 313 is located at other positions of the bracket 30 according to a position at which the elastic member 40 is abutted. For example, the support member 313 can protrude from the second fixing portion 32 toward the first fixing portion 31 if the elastic member 40 abuts against the second fixing portion 32.

The second fixing portion 32 defines at least one U-shaped hole 320, and an opening of the U-shaped hole 320 is adjacent to the connecting portion 33. In one embodiment, the second fixing portion 32 defines two U-shaped holes 320. It should be understood that a quantity of the U-shaped holes 320 can be designed according to specific needs. The first fixing portion 31, the second fixing portion 32, and the connecting portion 33 are integrally formed, and the second fixing portion 32 and the first fixing portion 31 are made to be substantially parallel to each other by bending the second fixing portion 32. The U-shaped holes 320 are defined in the second fixing portion 32, so that when the second fixing portion 32 is bent, a bending force is reduced, and the second fixing portion 32 can be operated more easily. A position where the second fixing portion 32 defines the U-shaped holes 320 corresponds in position to where U-shaped holes 314 are defined in the first fixing portion 31. It should be understood that in other embodiments, the U-shaped holes 314 may be omitted from the first fixing portion 31.

A strengthening portion 34 is disposed at a joint portion of the second fixing portion 32 and the connecting portion 33. The strengthening portion 34 enhances a connection between the second fixing portion 32 and the connecting portion 33. Two perpendicular sides of the strengthening portion 34 are respectively coupled to the second fixing portion 32 and the connecting portion 33, so that the second fixing portion 32 can bear a stronger force without breaking.

Referring to FIG. 6, a curing adhesive (not shown) is applied on dispensing areas A and B between the strengthening portion 34 and the first fixing portion 31 to fix the first fixing portion 31 and the second fixing portion 32. After the curing adhesive is applied, the curing adhesive may be solidified by a laser device to set an optimal position of the adjustment button 20.

Referring to FIGS. 2 and 6, the elastic member 40 is received in a U-shaped groove defined by the first fixing portion 31, the second fixing portion 32, and the connecting portion 33. One end of the elastic member 40 is fixed on the second fixing portion 32, and a second end of the elastic member 40 abuts against the first fixing portion 31. An elastic force of the elastic member 40 sets positions of the first fixing portion 31 and the second fixing portion 32. The curing adhesive is applied where the elastic member 40 abuts against the first fixing portion 31 to fix the elastic member 40 and the first fixing portion 31 at the dispensing area B. In other embodiments, one end of the elastic member 40 is fixed on the first fixing portion 31, and a second end of the elastic member 40 abuts against the second fixing portion 32. The elastic member 40 may be a spring. In other embodiments, the elastic member 40 may be other elastic members.

By providing the elastic member 40 in the bracket 30, the elastic member 40 can automatically adjust a distance between the bracket 30 and the switch button 200 when the adjustment button 20 is not pressed, so that a distance between the bracket 30 and the switch button 200 is minimized.

Referring to FIG. 3, a switch button bracket 50 configured to mount the switch button 200 is mounted on the housing 10. The switch button 200 mounted on the switch button bracket 50 engages with the bracket 30.

Referring to FIG. 6, when the adjustment button 20 is not pressed, the bracket 30 is in contact with the switch button 200 by the elastic force of the elastic member 40 to minimize a gap between the bracket 30 and the switch button 200. When an external force is applied to the adjustment button 20, the protruding posts 22 push the first fixing portion 31 to compress the elastic member 40 and drive the second fixing portion 32 to press the switch button 200, thereby adjusting a function of the electronic device. When the adjustment button 20 is released, the bracket 30 and the elastic member 40 are reset, and the elastic member 40 continues to abut against the second fixing portion 32 to minimize the gap between the bracket 30 and the switch button 200.

The switch button 200 may be a power button, a volume button, or other functional button of the electronic device.

In summary, the elastic member 40 disposed in the bracket 30 automatically adjusts a position of the bracket 30 to minimize the gap between the bracket 30 and the switch button 200 after the adjustment button 20 is pressed. The button restoring mechanism 100 has a simple structure, assembly is simplified, and production costs are reduced.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A button restoring mechanism of an electronic device, the button restoring mechanism comprising:
    a housing;
    a button mounted on the housing with one side protruding into the housing;
    a bracket latching with the button; and
    an elastic member having one end fixed to one side of the bracket, and a second end abutting against a second side of the bracket; wherein:
    an elastic force of the elastic member drives the second side of the bracket to abut against a switch button within the housing.

2. The button restoring mechanism of claim 1, wherein:
    the bracket comprises a first fixing portion, a second fixing portion, and a connecting portion;
    the connecting portion is coupled between the first fixing portion and the second fixing portion;
    the first fixing portion is latched with the button; and
    the second fixing portion abuts against the switch button.

3. The button restoring mechanism of claim 2, wherein:
the first fixing portion, the second fixing portion, and the connecting portion form a U-shaped structure.

4. The button restoring mechanism of claim 3, wherein:
the elastic member is mounted within the U-shaped structure, such that one end of the elastic member is fixed to one of the first fixing portion and the second fixing portion, and a second end of the elastic member abuts against the other one of the first fixing portion and the second fixing portion.

5. The button restoring mechanism of claim 4, wherein:
one end of the elastic member is fixed to either the first fixing portion or the second fixing portion by a curing adhesive; and
a gap between the first fixing portion and the second fixing portion is filled by the curing adhesive.

6. The button restoring mechanism of claim 2, wherein:
the button comprises a button cap and at least one protruding post extending from the button cap;
the button cap is located outside the housing;
the at least one protruding post extends into an interior of the housing.

7. The button restoring mechanism of claim 6, wherein:
the first fixing portion defines at least one opening;
the at least one protruding post defines a groove;
the at least one protruding post passes through the at least one opening, and the groove of the at least one protruding post receives an edge of the at least one opening to latch the first fixing portion with the button.

8. The button restoring mechanism of claim 7, wherein:
the bracket is made of stainless steel and has elasticity.

9. An electronic device comprising:
a switch button; and
a button restoring mechanism comprising:
  a housing receiving the switch button;
  a button mounted on the housing with one side protruding into the housing;
  a bracket latching with the button; and
  an elastic member having one end fixed to one side of the bracket, and a second end abutting against a second side of the bracket; wherein:
    an elastic force of the elastic member drives the second side of the bracket to abut against the switch button.

10. The electronic device of claim 9, wherein:
the bracket comprises a first fixing portion, a second fixing portion, and a connecting portion;
the connecting portion is coupled between the first fixing portion and the second fixing portion;
the first fixing portion is latched with the button; and
the second fixing portion abuts against the switch button.

11. The electronic device of claim 10, wherein:
the first fixing portion, the second fixing portion, and the connecting portion form a U-shaped structure.

12. The electronic device of claim 11, wherein:
the elastic member is mounted within the U-shaped structure, such that one end of the elastic member is fixed to one of the first fixing portion and the second fixing portion, and a second end of the elastic member abuts against the other one of the first fixing portion and the second fixing portion.

13. The electronic device of claim 12, wherein:
one end of the elastic member is fixed to either the first fixing portion or the second fixing portion by a curing adhesive; and
a gap between the first fixing portion and the second fixing portion is filled by the curing adhesive.

14. The electronic device of claim 10, wherein:
the button comprises a button cap and at least one protruding post extending from the button cap;
the button cap is located outside the housing;
the at least one protruding post extends into an interior of the housing.

15. The electronic device of claim 14, wherein:
the first fixing portion defines at least one opening;
the at least one protruding post defines a groove;
the at least one protruding post passes through the at least one opening, and the groove of the at least one protruding post receives an edge of the at least one opening to latch the first fixing portion with the button.

16. The electronic device of claim 15, wherein:
the bracket is made of stainless steel and has elasticity.

\* \* \* \* \*